United States Patent [19]

Beavers

[11] Patent Number: 4,628,541

[45] Date of Patent: Dec. 9, 1986

[54] INFRA-RED DATA COMMUNICATIONS SYSTEM FOR COUPLING A BATTERY POWERED DATA ENTRY DEVICE TO A MICROCOMPUTER

[75] Inventor: John A. Beavers, Boca Raton, Fla.

[73] Assignee: International Business Machines Corporation, Armonk, N.Y.

[21] Appl. No.: 702,282

[22] Filed: Feb. 15, 1985

Related U.S. Application Data

[63] Continuation of Ser. No. 522,063, Aug. 10, 1983, abandoned.

[51] Int. Cl.[4] .................................................. H04B 9/00
[52] U.S. Cl. ........................................ 455/603; 375/68; 375/96; 455/608; 455/617
[58] Field of Search ............... 455/603, 608, 618, 617, 455/619; 375/96, 68

[56] References Cited

U.S. PATENT DOCUMENTS

| | | | |
|---|---|---|---|
| 2,464,667 | 3/1949 | Boosman et al. | 375/68 |
| 3,906,484 | 9/1975 | Melvin, Jr. et al. | 375/96 |
| 4,399,564 | 8/1983 | Cowen | 455/608 |
| 4,426,662 | 1/1984 | Skerlos et al. | 455/603 |
| 4,514,732 | 4/1985 | Hayes, Jr. | 455/603 |

FOREIGN PATENT DOCUMENTS

52-72502  6/1977  Japan .................. 455/608

*Primary Examiner*—Joseph A. Orsino, Jr.

[57] ABSTRACT

A battery powered keyboard entry device includes an infra-red generator for coupling the device to a microcomputer which includes an infra-red receiver. Each input binary signal is transmitted as a few (e.g. two or three) short infra-red pulses indicating the leading edge of the binary signal. In the receiver, the received groups of pulses, after detection and amplification, are stretched by a single-shot circuit to produce binary signals of substantially the same length as the original binary signals. As each transmission is substantially shorter than each binary signal, power consumption in the keyboard entry device is substantially reduced as compared with a system in which the infra-red pulses for each input signal extend over the input signal length.

4 Claims, 4 Drawing Figures

INFRA-RED DATA COMMUNICATIONS SYSTEM FOR COUPLING A BATTERY POWERED DATA ENTRY DEVICE TO A MICROCOMPUTER

This is a continuation of application Ser. No. 522,063, filed Aug. 10, 1983, now abandoned.

TECHNICAL FIELD

The present invention relates to infra-red data communications systems and in particular to such a system employed to transmit data from a battery powered data entry device to a microcomputer.

BACKGROUND ART

Infra-red communications links are used in many applications. Probably the most common is the remote control of television receivers. In such systems, pulse coded infra-red signals are generated in a hand-held, battery powered control unit. Different codes are generated in accordance with push-button inputs to control, for example, channel switching and volume level. Other applications of such hand-held devices include the control of various other domestic appliances and the remote control of mobile models.

In another group of infra-red transmission applications, a continuous pulse modulated beam is generated, and a sensor device determines when the beam is interrupted. These applications include intruder detection and article counting in, for example, manufacturing lines.

It should be noted that in the first of the above mentioned groups of applications, that is the television and domestic appliance controls, the number of transmissions per day is somewhat limited, and can be counted in tens. In the second group, the transmitter systems are normally energised from an a.c. line source. A problem occurs when a battery powered control unit is to be used for thousands of operations per day. This problem is, of course, battery life. Such a problem occurs when the transmitter system forms part of a keyboard entry device for a microcomputer, whereby the coupling between the keyboard device and the microcomputer is via an infra-red link. In such an arrangement, most keystrokes will generate a data set for transmission and at an average keystroke speed of, for example, fifty strokes per minute, three thousand characters are generated each hour. Comparing this with the television controller system usage, it is seen that the daily usage varies by a factor of greater than 1000:1. Thus, in the keyboard entry system, battery life is an important consideration, and any reduction in current consumption is highly significant.

U.S. Pat. No. 4,313,227 (Eder) shows a system in which data entry devices are coupled to a microcomputer through infra-red links. In that system, the main keyboard is in the microcomputer, and portable control units, each comprising a joystick device and a keypad, are coupled via infra-red links. No specific battery consumption minimising arrangement is shown for the control units. This is most probably because they are games input devices and, therefore, are not designed for the prolonged use expected from a full keyboard device.

It is an object of the present invention to provide an infra-red data transmission system for coupling data from a battery powered keyboard entry device to a microcomputer with reduced battery power consumption.

DESCRIPTION OF THE INVENTION

The present invention provides an infra-red data transmission system for coupling data from a battery powered keyboard entry device to a microcomputer, in which an infra-red generator in the keyboard is driven to provide a pulse modulated infra-red beam comprising bursts of pulses representing the leading edges of data bits each pulse burst extending for a period substantially less than half of a data bit period.

BRIEF DESCRIPTION OF THE DRAWINGS

Referring to FIG. 1, a microcomputer unit 2 includes a diskette unit 5 and an infra-red detector positioned behind a window 4. A battery powered keyboard entry device 1 comprises a keyboard 6 and an infra-red generator comprising a light emitting diode (not shown). In response to the depression of the keys in keyboard 6, the keyboard entry device generates a modulated infra-red signal beam 3 for reception by the microcomputer unit. The microcomputer unit converts the received signals into a format suitable for its processing operations.

FIG. 2 is a simplified diagram of the keyboard entry device circuitry. It comprises a microprocessor 10, for example the 80C48 processor produced by Intel Corporation, coupled to a matrix keyboard 11 by a bus 25 comprising eight drive lines. The keyboard is coupled back to the microprocessor 10 by a bus 24 comprising eight sense lines. As is well known, the matrix keyboard has eight row lines coupled to the input drive lines 25 and eight column lines coupled to the eight sense lines 24. Each key, when depressed, couples a column and a row line unique to that key. Thus when the drive lines are driven from port P10 through P17 of microprocessor 10 in sequence, selected sense lines are energised in accordance with which keys are depressed. Microprocessor 10 then converts the sense signals received by its data input bus DB0 through DB7 into digital code form for serial transmission. An example of transmission code can be seen at waveform A in FIG. 3. This is an asynchronous bi-phase serial code in which a logically encoded '1' bit is represented as a '1' bit for the first half of a bit cell, and a logically encoded '0' is represented as a '1' bit in the second half of a bit cell. This data would normally be transmitted in an infra-red data transmission system by modulating the infra-red generator by pulses from output P25 of microprocessor 10 to provide an output as shown in waveform C in FIG. 3. As indicated in waveform C, the infra-red generator is pulsed for half of each bit cell. In an exemplary system, with each bit cell having a period of $450\mu$ sec, there are fifteen generator pulses in each transmitted half bit cell, and each pulse is $7.5\mu$ secs. in length, assuming a 50% duty cycle.

It has now been realized that it is not necessary to transmit pulses for a full half period of each bit cell. By reducing the number of pulses, a considerable increase in the life of the keyboard entry device battery can be achieved, primarily because the infra-red generator is the main current consuming device. As an example, the average consumption of the electronics, apart from the LED drive, assuming that the microprocessor is in its standby mode, taking some 1.5 A, for much of the time and in its dynamic mode, taking some 6 m A, for keystroke routines, the battery drain is about 2 m A - hr. for an eight hour day.

Figure 2:
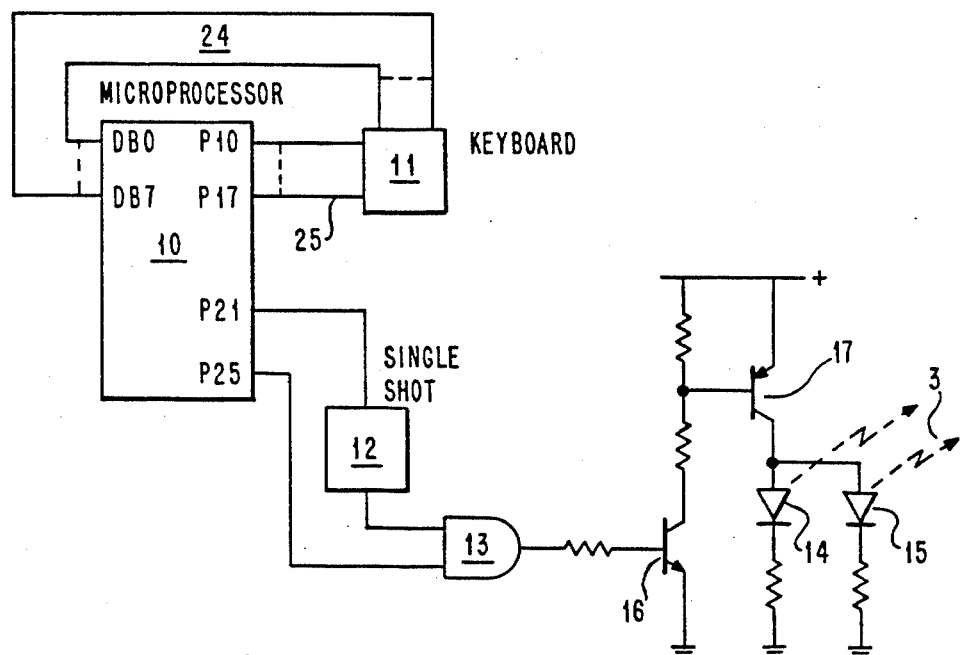
FIG. 2 shows the key sensing and data transmission circuits in the keyboard entry device of FIG. 1.

Turning now to the LED drive, it is noted, in FIG. 2, that two LED's 14 and 15 are employed in the keyboard entry device. It has been found desirable to employ two, rather than one, to ensure reliable communication between the keyboard entry device and the microcomputer, especially when the two are in close proximity. An average drive current for a suitable LED is about 1A, so the required modulation current for the present system is 2A. Taking the modulation system shown in waveform C of FIG. 2, and described above, with a bit period of 450$\mu$ sec., fifteen pulses in each half bit cell, each pulse is 7.5$\mu$ sec in length, assuming a 50% duty cycle. With 12000 keystrokes per 8 hour day, each generating a ten bit make code and a ten bit break code, the codes comprising a start bit, eight data bits and a parity bit, the LED current drain is:

$2 \times 24000 \times 7.5/10^6/3600 \times 15 \times 10 \times 1000 = 15$ mA - hr. per day.

With the modulation system shown in waveform D of FIG. 2, there are only three pulses per bit rather than the fifteen of waveform C, this current drain is cut by 5, to give 3 mA - hr per eight hour day.

Thus, with the full bit modulation system of fifteen pulses, the total battery drain from the electronics and the LED drive is 17 mA - hr. per day, which, with a 600 mA - hr battery, will given an operating life of 35 days. With the three bit modulation system, the total drain becomes 5 mA - hr per day, which, with a 600 mA - hr. battery, gives a 120 day life.

Figure 3:
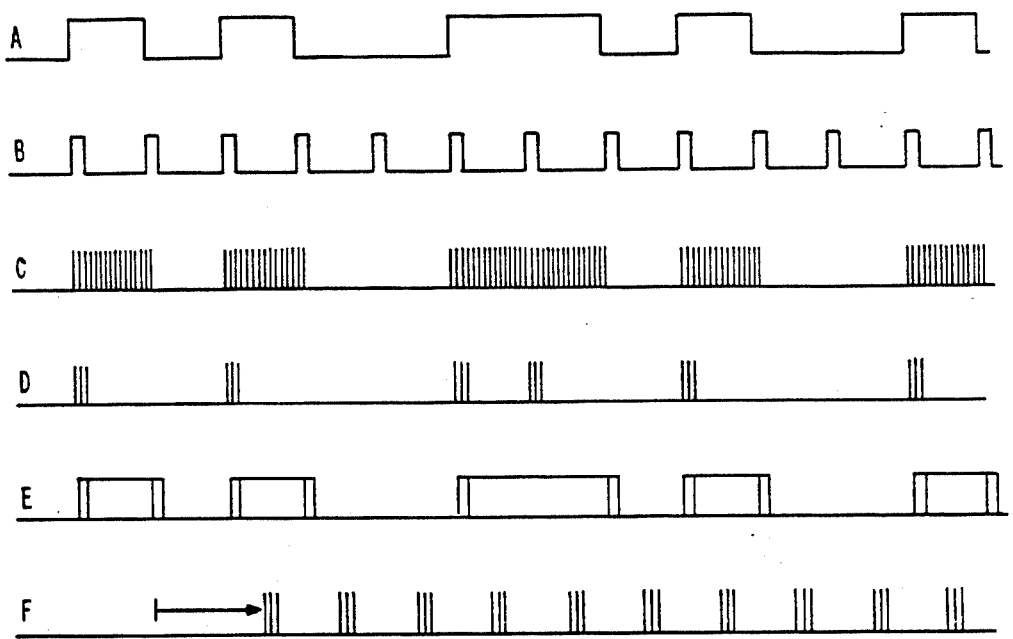
FIG. 3 is a timing diagram showing the timing of signals generated in the FIG. 1 system.

Returning now to FIG. 2, this shows an exemplary circuit for producing the three pulse per bit output. Microprocessor 10 is programmed to produce the waveform C (FIG. 3) signals on an output part line P25 and clock signals as shown in waveform B of FIG. 2 on an output part line P21. The clock signals are applied to a single shot circuit 12 which, in response to each, produces an output pulse of between 40 to 45$\mu$ sec. These output pulses are applied to an AND gate 13 together with the outputs from port line P25 to provide the three pulse per bit signals shown at waveform D in FIG. 3. These signals are applied to an LED drive circuit comprising transistors 16 and 17 and their associated resistors to drive the LED's 14 and 15. It should be noted that it may well be possible to program microprocessor 10 to produce the three pulse per bit signals directly to drive the LED drive circuit.

Figure 1:
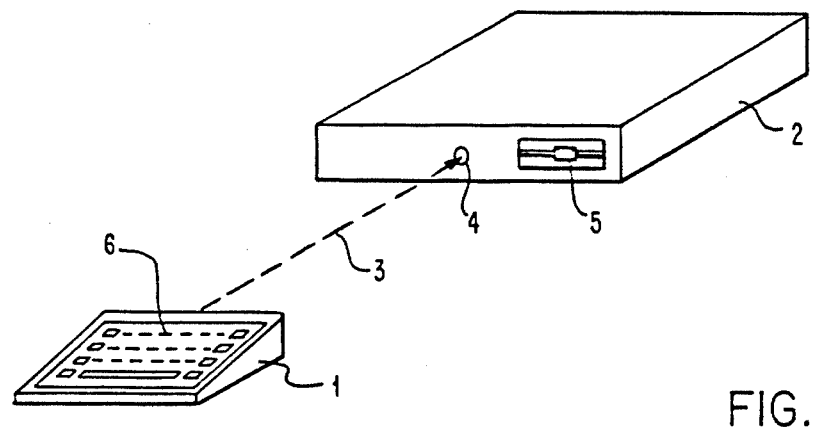
FIG. 1 shows a keyboard entry device coupled to a microcomputer by an infra-red link.
Figure 4:
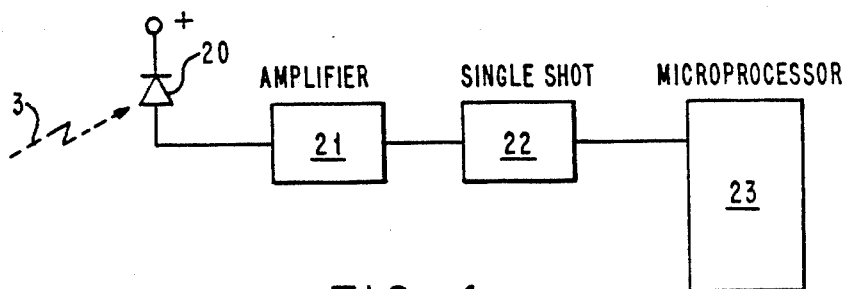
FIG. 4 is a diagram of the receiver circuit employed in the microcomputer of FIG. 1.

FIG. 4 is a simplified block diagram of a suitable infra red receiver positioned in the microcomputer 2 of FIG. 1. It comprises a photo sensor diode positioned to receive the infra red pulses 3 from the keyboard entry device 6 of FIG. 1. The received pulses produced output pulses from diode 20 which are amplified and shaped by an amplifier 21, the output of which is applied to a single-shot circuit 22. In response to the first of a group of the received pulses, this single-shot circuit provides an output pulse 225$\mu$ sec. in length. Note that this first received pulse in a group may not necessarily correspond to the first pulse actually transmitted. This may be lost in the propagation between the keyboard and the microcomputer, and therefore, the second or third of the three pulses of waveform D (FIG. 3) may be the first received. Waveform E shows the output of single-shot circuit 22 and indicates that it corresponds to the code pattern of waveform A, but with its timing dependent on the first detected pulse of each group. For simplicity, the fixed delay due to the transmitter and receiver electronics and the variable propagation delay have not been indicated in the waveforms. The outputs of single-shot circuit 22 are applied to a microprocessor 23 for processing to produce data in the microcomputer in a form suitable for further processing operations. In particular, microprocessor 23 is programmed to detect the lagging edge of the first pulse in a ten bit received group and, after a delay of about 230$\mu$ sec, shown as an arrow on waveform F in FIG. 3, produce a series of groups of sample pulses spaced apart by 225$\mu$ sec. to sample the incoming data group apart, of course, from the first bit, which, as has been mentioned above, is the start bit. To ensure reliable recovery of the data in the receiver each bit is subjected to this repeated sampling and its value to determined by majority vote of the samples. Three samples per bit have been shown, but five may be better.

Thus, what has been shown is a system for linking a keyboard data entry device to a microcomputer by an infra-red link. Each transmitted bit is represented by a series of infra red pulses which together are considerably shorter than a normal data bit representation in the entry device or the microcomputer. The transmission system employed is an asynchronous binary coded system, in which each bit is represented as an output in either the first or the second half of a bit cell. In the example shown, each bit cell is represented by three pulses which occupy a period of one fifth of the period of a half bit cell and indicated the leading edge of a signal in this cell. At the receiver, the received pulse groups are stretched by a single-shot circuit to generate receiver signals which correspond to the original half bit cell pulses.

It is, of course, clear that, depending on the particular transmitting and receiving devices employed and the intended transmission path lengths, fewer or more infra red pulses per bit may be used. However, in order to achieve reliable communication, at least two are desirable, and in order to maximise the conservation of battery power, the minimal number for reliable communication is desirable.

While the advantage of battery power conservation has been discussed above, other advantages accrue from the invention. As the average transmitter power is reduced, the LED drivers may be housed in one module rather than needing to be high power discrete devices. As there are fewer LED drive cycles per data pulse, the lifetime of these devices is considerably increased. Lastly, the receiver amplifier may be reduced in complexity and, therefore, cost. This is because with the system in which each transmitted pulse group occupies a full half bit cell, saturation delays when large signals are received tend to widen the data pulse contributing to sampling errors. Steps have, therefore, to be taken to design the amplifier to prevent such delays. With a system in accordance with the invention, it has been found that these saturation delays do not occur because of the lower power of the received signals, so this problem is eliminated.

Whilst the invention has been particularly described with reference to a preferred embodiment, it will be understood by those skilled in the art that various other changes in form and detail may be made without departing from the spirit and scope of the invention.

I claim:

1. An infra-red data communications system for coupling a battery powered keyboard data entry device to a microcomputer, in which said keyboard data entry device comprises means, including a microprocessor, for developing, in response to each keystroke, a binary data signal stream representing a start bit followed by a predetermined fixed number of data bits, each binary data signal comprising a predetermined signal level for a fixed period, and for driving an infra-red generator to develop, from each binary data signal, a single burst of infra-red pulses, of which the first pulse corresponds to the leading edge of the binary data signal, said burst extending for a period substantially less than half of the period of the binary data signal, and in which the microcomputer includes means for detecting and amplifying said bursts of infra-red pulses, and signal generating means coupled to the output of the detecting and amplifying means and responsive to detection of an initial pulse in a received burst comprising, when propagation loss is encountered, at least one but less than all of the developed burst of pulses, to generate an output binary code signal comprising a predetermined signal level for said fixed period and having a leading edge corresponding to said initial pulse, said microcomputer further including a microprocessor responsive to the lagging edge of the output signal representing the start bit to generate a series of sampling pulses to sample the output signals representing the data bits.

2. An infra-red communication system according to claim 1 in which each said single burst of infra-red pulses comprises two or more pulses extending for a period of one-fifth or less of the period of a coded data signal.

3. An infra-red communications system according to claim 1 in which said signal generating means comprises a single shot circuit set to a period corresponding to said fixed period.

4. An infra-red communications system according to claim 3 in which said single burst of infra-red pulses comprises two or more pulses extending for a period of one-fifth or less of the period of a coded data signal.

* * * * *